US006461993B1

(12) United States Patent
Van Der Heijden et al.

(10) Patent No.: US 6,461,993 B1
(45) Date of Patent: Oct. 8, 2002

(54) METHOD FOR PREPARING A HYDROGENATION CATALYST SYSTEM

(75) Inventors: Harry Van Der Heijden; Hendrik Van De Weg, both of Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/416,218

(22) Filed: Oct. 8, 1999

(30) Foreign Application Priority Data

Oct. 30, 1998 (EP) ............................................ 98308932

(51) Int. Cl.⁷ .................................................. C08F 4/02
(52) U.S. Cl. ....................... 502/104; 502/109; 525/338; 525/339
(58) Field of Search ................................. 502/104, 109

(56) References Cited

U.S. PATENT DOCUMENTS

| | | | |
|---|---|---|---|
| 3,401,983 A | * 9/1968 | Reid, Jr. et al. | ............... 303/21 |
| 3,663,635 A | 5/1972 | Lassau et al. | ............. 260/666 P |
| 5,039,755 A | 8/1991 | Chamberlain et al. | ...... 525/338 |
| 5,132,372 A | 7/1992 | Chamberlain et al. | ...... 525/338 |
| 5,173,537 A | 12/1992 | Chamberlain et al. | |
| 6,291,596 B1 | * 9/2001 | Sasanuma et al. | ....... 525/332.8 |

FOREIGN PATENT DOCUMENTS

| | | |
|---|---|---|
| DE | 3401983 | 1/1983 |
| EP | 0339986 | 4/1989 |
| EP | 0434469 | 12/1990 |
| EP | 0544304 | 11/1992 |
| EP | 0796564 | 3/1997 |
| EP | 0810231 | 5/1997 |
| EP | 0974602 A1 | 1/2000 |
| JP | 8-33846 | 5/1995 |
| WO | WO 95/25130 | 9/1995 |

* cited by examiner

*Primary Examiner*—Bernard Lipman
(74) *Attorney, Agent, or Firm*—Donald F. Haas (57) ABSTRACT

This invention concerns a method for preparing a hydrogenation catalyst system involving the reaction of a group 4 metallocene (A) with a metal hydride or an organometallic compound (B) at a (B)/(A) molar ratio that is larger than 10 followed by the activation of the resulting catalyst mixture with hydrogen at a hydrogen pressure p (in MPa) and at a temperature T (in ° C.), wherein a neutralising agent (C) that is capable of reacting with the compound (B) is added to the catalyst mixture a) either prior to the activation, or
  b) within t hours from the activation wherein t equals x divided by $(p*T*(B)/(A))$, and $x=10,000$, and a process for the hydrogenation of an olefinically unsaturated compound with hydrogen in the presence of a hydrogenation catalyst system obtained by the method of the invention.

13 Claims, 4 Drawing Sheets

Figure 1: Hydrogenation profile as a function of the Ti level on cement using $Cp_2TiCl_2$ as a catalyst precursor Figure 2: Effect of LiH neutralisation on the hydrogenation rate using $Cp_2TiCl_2$ as a catalyst precursor (6.5 ppm of Ti on cement)

Figure 3: Hydrogenation profiles after neutralisation LiH with ethanol using 6.5, 4.8, 2.7 and 1 ppm of titanium on cement Figure 4: End conversions after 3 hours as a function of the amount of ethanol Figure 5: Conversion data at 60, 100 and 180 minutes as a function of the activation time Figure 6: Hydrogenation activity after catalyst ageing under nitrogen for 4 hours at 50 °C Figure 7: Hydrogenation activity after catalyst ageing for 4 hours at 50 °C in the presence of LiH Figure 8: Conversion data as function of the activation temperature

US 6,461,993 B1

METHOD FOR PREPARING A HYDROGENATION CATALYST SYSTEM

FIELD OF THE INVENTION

This invention concerns a method for preparing a hydrogenation catalyst system, and a process for the hydrogenation of an olefinically unsaturated compound with hydrogen in the presence of a hydrogenation catalyst system obtained by the method of the invention.

BACKGROUND OF THE INVENTION

U.S. Pat. No. 3,663,635, DE 3401983, U.S. Pat. No. 5,039,755, U.S. Pat. No. 5,132,372, EP 339986, EP 434469, EP 544304, EP 795564, EP 810231, and WO 9525130 describe catalyst systems for the hydrogenation of olefinically unsaturated compounds, and in particular for the hydrogenation of conjugated diene (co)polymers. These catalyst systems are prepared by reacting a titanocene or similar group 4 metallocene (A) (i.e., a ferrocene-like molecule based on a group 4 metal and 2 $\eta^5$ ligands), with a metal hydride or an organometallic compound (B) and contacting (activating) the resulting catalyst mixture with hydrogen. These catalyst systems have a very high hydrogenation activity.

U.S. Pat. No. 3,663,635, for instance, describes catalyst systems for the hydrogenation of unsaturated compounds such as olefins based on titanocenes of the formula $TiX_2Y_2$ in which X represents halide, amino, hydrocarbylamino, thio, carboxylate, alkoxide or a hydrogen atom, and Y is cyclopentadienyl, indenyl, fluorenyl or allyl substituted or not, which are reacted with an aluminium hydride.

DE 3401983 describes catalyst systems for the hydrogenation of (co)polymers of conjugated dienes based on titanocenes of the formula $(C_5H_5)_2TiRR'$ wherein R and R' may be the same or different, representing a $C_1$–$C_8$ alkyl or alkoxy group; $C_6$–$C_8$ aryl, aryloxy, aralkyl- or cycloalkyl group; a halogen atom or a carbonyl group, which are reacted with a lithium compound, i.e., a living (polybutadiene) polymer.

U.S. Pat. No. 5,039,755 describes the hydrogenation of a conjugated diene (co)polymer that is terminated with hydrogen in the presence of a titanocene to which sec-butyllithium is added.

U.S. Pat. No. 5,132,372 concerns the use of methyl benzoate as promoting agent in titanocene-based hydrogenation reactions. Further promoters are disclosed in U.S. Pat. No. 5,173,537 which describes the deactivation of lithium hydride by addition of various reagents prior to hydrogenation and titanium catalyst addition.

EP 339986 concerns hydrogenation catalyst systems consisting of at least one titanocene and a lithium compound in a molar ratio of 1/0.5 to 1/20, and optionally a reducing organometallic compound selected from the group consisting of aluminium compounds, zinc compounds and magnesium compounds.

EP 434469 describes a hydrogenation catalyst system based on at least one group 4 metallocene, at least one complex lithium, sodium or potassium compound, and optionally a polar compound or an alkali oxyhydrocarbyl compound.

EP 544304 describes a hydrogenation catalyst system based on at least one group 4 metallocene, at least one polarized compound selected from the group consisting of carbonyl group-containing compounds and epoxy group containing compounds, and an organic lithium compound.

Ligand variations have been subject of study as well. For instance, EP 795564 describes a catalyst composition based on indenyl or an indenyl-like compound as ligand, whereas EP 810231 describes catalyst systems based on heterocyclic (phosphorus containing) cyclopentadienyl-like compounds as ligand.

A zirconium-based hydrogenation catalyst system is described in WO 9525130.

Unfortunately, the activity of these catalyst systems strongly depends on a proper molar ratio of (B) over (A). It is common practice in the above documents to specify a molar ratio of (B)/(A) in the range of, e.g., 2 to 20 (e.g., DE 3401983). However, the actual operating window illustrated in the art is much narrower than this. Typically the (B)/(A) ratio at which adequate hydrogenation is achieved is in the range of 5 to 10. Apparently, at lower ratios the metallocene is insufficiently activated. At higher ratios the catalyst systems are less effective, believed to be due to increased catalyst decay. This is particularly unfortunate if the metal hydride or organometallic compound (B) is already present in high amounts in the olefinically unsaturated compounds to be hydrogenated.

It will therefore by appreciated that there is a need for an improved catalyst preparation method and an improved hydrogenation process.

From JP 8033846 a catalyst preparation method is known wherein a storage stable catalyst system is prepared by reacting the titanocene (A) with an organometallic compound (B) in the presence of a polymer containing olefinic unsaturated double bonds. The resulting catalyst mixture is in direct contact with hydrogen, and to this a polar compound is added.

The catalyst system of this Japanese patent document is produced separately from the olefinically unsaturated compound. Optimising the (B)/(A) ratio will therefore be less of a problem. Moreover, should the catalyst system should suffer from catalyst decay during hydrogenation, then additional catalyst may be withdrawn from storage and added to the hydrogenation reaction.

However, although the problem of catalyst decay would appear to be circumvented, it is not solved. Besides, if the catalyst system is to be used for the hydrogenation of a solution containing freshly prepared diene (co)polymers, than organometallic compounds still present therein need to be destroyed first to ensure the optimal (B)/(A) ratio (about 8) is maintained.

The present invention accordingly aims at providing a method for preparing a more robust catalyst system, i.e., that suffers less from catalyst decay, can be prepared in situ and at conventional but also higher (B)/(A) ratios and has increased hydrogenation activity.

SUMMARY OF THE INVENTION

Accordingly, a method is provided for preparing a hydrogenation catalyst system involving the reaction of a group 4 metallocene (A) with a metal hydride or an organometallic compound (B) at a (B)/(A) molar ratio that is larger than 10 followed by the activation of the resulting catalyst mixture with hydrogen at a hydrogen pressure p (in MPa) and at a temperature T (in °C.), wherein a neutralising agent (C) that is capable of reacting with the compound (B) is added to the catalyst mixture a) either prior to the activation, or b) within t hours from the activation wherein t equals x divided by (p*T*(B)/(A)), and x=10,000.

Also, a process is provided for the hydrogenation of an olefinically unsaturated compound with hydrogen in the presence of a hydrogenation catalyst system obtained by the method described above.

DETAILED DESCRIPTION OF THE INVENTION

The group 4 metallocene (A) may be any of the metallocenes mentioned in documents mentioned above. Such compounds may be represented by the following general formula:

in which each R represents the same or a different substituted or unsubstituted, fused, and/or heterocyclic cyclopentadienyl-like $\eta^5$ ligand (the Greek letter "eta"—"$\eta$"—signifies that two or more contiguous atoms of the cyclopentadienyl group are attached to the metal; the superscript 5 signifies the number of atoms that are attached); each R' represents the same or a different group selected from $C_1$–$C_{12}$ hydrocarbyl groups, $C_1$–$C_{12}$ hydrocarboxyl groups, a carbonyl group, a beta-diketone coordination group or—preferably—a halogen atom, and M is a titanium, zirconium or hafnium atom.

M is preferably a titanium atom. Suitable examples of R include the heterocyclic cyclopentadienyl-like $\eta^5$ ligands disclosed in EP 810231, and/or the fused ring system -such as indenyl or fluorenyl- disclosed in U.S. Pat. No. 3,663,635 and EP 795564. Preferably, both groups R are the same and represent a cyclopentadienyl group.

Suitable substituents, in case one or both groups R are substituted, include halogen atoms, hydrocarbyl groups and/or hydrocarbyloxy groups of up to 12 carbon atoms. The expressions hydrocarbyl and hydrocarboxyl used above include alkyl and alkoxy groups (cyclic, linear or branched); aryl and aryloxy groups and substituted variants thereof. Preferably each R' is a halogen atom, more preferably a chloride atom. Therefore, the most preferred group 4 metallocene is bis(cyclopentadienyl)titanium dichloride ($Cp_2TiCl_2$).

The metallocene is used in amounts of from 0.1 to 500, typically from 1 to 100, mg per kg of unsaturated compound, and preferably in amounts in the range of from 5 to 50 mg/kg. More may be used to speed up the hydrogenation process, but also, given the increased activity of the catalyst system, less may be used to reduce the cost and environmental impact of the catalyst system.

The more common organometallic compounds used as compound (B), at least in respect of the hydrogenation of (co)polymers of conjugated dienes, are lithium compounds and/or lithium hydride. Examples of the lithium compounds include the living polymer produced using a lithium-based polymerization initiator and added organic lithium compounds such as alkyllithium. Suitable organic lithium compounds are, for instance, listed in EP 544304.

In case of the hydrogenation of (co)polymers of conjugated dienes, the lithium hydride may be suitably produced by terminating the lithium-based initiated polymerization by the addition of hydrogen. Since the living polymer and the lithium hydride are readily available, they are preferred.

However, compound (B) may also be selected from the group organometallic compounds mentioned in JP 8033846, e.g., Na—, K—, Mg—, Ba—, Zn—, Al— or Ca— containing compounds having reducing activity or in any of the other patent documents mentioned herein before.

The initial molar ratio of compound (B) over group 4 metallocene (A) may vary widely. In contrast to the patent documents mentioned in this specification, there is no upper limit to this ratio. Thus, in the prior art processes the ratio is limited to for instance: 3–30 (U.S. Pat. Nos. 5,039,755; 5,132,372; 5,242,986; EP 532099); 6–25 (EP 795564; EP 801079; EP 810231); 0.5–20 (EP 339986; EP 434469); 2–20 (DE 3401983); 5–15 (U.S. Pat. No. 5,244,980); less than 15 (EP 601953) or less than 6 (U.S. Pat. No. 5,173,537). A (B)/(A) ratio in the present process of less than 1000 will most definitely activate all of the metallocene, without poisoning the catalyst system as would occur in the prior art processes. The preferred lower limit (based on economical factors) is at least 15, more preferably at least 20. Suitably, the (B)/(A) molar ratio is in the range of 20–500, more preferably in the range of 25–200, e.g., in the range of 25–100.

The reaction with the metallocene (A) is relatively straightforward. The metallocene is either dissolved in a suitable, inert solvent to which subsequently compound (B) is added or vice versa. No specific pressure and temperature conditions apply. For instance, the metallocene (A) and compound (B) may be reacted by contacting these components for about 1 to 60 minutes, preferably for 5 to 20 minutes at a temperature in the range of 20–90° C. and at a pressure in the range of 0.0 to 5.0 MPa.

The nature of the neutralisation agent (C) depends on the nature of compound (B). Other relevant factors affecting the choice of neutralisation agent are for instance its environmental impact, and its impact on the product qualities and ease of handling.

Suitable neutralisation agents include for instance the compounds mentioned in JP 8083346, e.g., selected from ketone compounds, sulphoxide compounds, carboxylic acid compounds, carboxylate ester compounds, aldehyde compounds, lactone compounds, lactam compounds, amine compounds, amide compounds, nitrile compounds, epoxy compounds and oxime compounds, and the polarized compounds mentioned in EP 0544304. Good results have been found using aliphatic and/or aromatic alcohols, for instance, lower alkyl alcohols ($C_1$ to $C_6$), and optionally substituted phenols. Very good results have been found with the use of ethanol.

Preferably, neutralising agent (C) is added to the catalyst mixture formed by the reaction of metallocene (A) with compound (B) before activation. In other words, metallocene (A) and compound (B) are reacted in an inert (hydrogen-free) environment, neutralising agent (C) is added, and then the catalyst mixture is activated with hydrogen.

However, at temperatures at or below 25° C. and pressures at or below 1 MPa catalyst decay is still relatively insubstantial. Neutralising agent (C) may therefore be added within, for instance, 3 hours from activating the catalyst intermediate without adversely affecting its performance. Indeed, even longer periods may be contemplated, if the temperature and/or pressure is low enough.

At temperatures above 25° C. or pressures above 1 MPa, catalyst decay will increasingly affect the catalyst performance. The beneficial effects of the present invention may still be achieved if the neutralising agent (C) is added within t hours, wherein t equals x divided by $p*T*(B)/(A)$, and x=10,000, preferably 7,500, more preferably 5,000. The smaller x is, the quicker one is to add the neutralising agent (C). For instance, at temperatures within 50 to 90° C. and hydrogen pressures above 1 MPA, neutralising agent (C) is added within 15 minutes from activating the catalyst mixture.

The presence of metal hydride or organometallic compound (B) and, more importantly, of neutralising agent (C) during the subsequent hydrogenation process is preferably avoided. In other words, the amount of (C) should be sufficient to consume a substantial part of compound (B) remaining after reaction with metallocene (A). Preferably, neutralising agent (C) is used in a molar ratio of (C)/(B) in the range of 0.1 to 1.05, more preferably in a range of 0.45 to 1.0, e.g., most preferably in the range of 0.5 to 0.9, best in an amount of about 0.6.

The neutralisation of excess compound (B) is relatively straightforward as well. For instance, if the catalyst mixture is a solution comprising the olefinically unsaturated compound and the reaction product of metallocene (A) with compound (B), then neutralising agent (C) may be simply added to that solution. Again, no specific pressure and temperature conditions apply. The neutralisation reaction of compound (B) with agent (C) may for instance be carried out at the conditions described with respect to the reaction of metallocene (A) with compound (B).

The catalyst system may comprise other components, such as the various promoters mentioned in the referred documents.

Like in U.S. Pat. No. 3,663,635, the catalyst may be used for the hydrogenation of olefinically unsaturated compounds. However, they are preferably used in the hydrogenation of polymers. Polymers that can be hydrogenated by the process of the invention have been described in the various patent documents referred to in the present specification. Of particular interest are polymers of conjugated dienes such as 1,3-butadiene and/or isoprene and copolymers (random or block) of these dienes with vinylaromatic monomers, e.g. with styrene. The process may be used to hydrogenate high and low molecular weight polymers.

The catalyst system has been found to show excellent activity and stability, whereas it is now much more easy to achieve full hydrogenation at even less than ideal conditions.

The hydrogenation process can be performed at partial hydrogen pressures in the range of from 0.1 to 10 MPa, and preferably from 0.1 to 5.0 MPa.

Preferably, the unsaturated compound to be hydrogenated is diluted with and/or dissolved in a solvent. Hydrocarbon solvents used in the hydrogenation reaction may be aliphatic hydrocarbons, e.g., pentane, hexane, heptane, octane, etc.; alicyclic hydrocarbons, e.g., cyclopentane, methyl cyclopentane, cyclohexane, etc., or an aromatic solvent such as toluene. These hydrocarbon solvents may contain 20% by weight or a smaller amount of ethers such as diethyl ether, tetrahydrofuran, dibutyl ether, diethoxypropane, dioxane.

Olefinically unsaturated polymers are typically hydrogenated whilst dissolved in a hydrocarbon solvent, for instance the solvent in which the polymer is produced. Usually, the polymer concentration is 1–30% by weight, and preferably 3–20% by weight.

The hydrogenation reaction is effected by supplying hydrogen, with or without stirring, while maintaining the temperature of the (dissolved) unsaturated compound at a specified temperature. The temperature suitable for the hydrogenation reaction is 0 to 150° C. A temperature lower than 0° C. is uneconomical, since the rate of hydrogenation is retarded. If the temperature is higher than 150° C., on the other hand, side-reactions and/or decompositions may occur. Moreover aromatic rings will be hydrogenated at the same time leading to a poor hydrogenation selectivity if only olefinically unsaturated bonds are to be hydrogenated. A more preferable temperature range is 20 to 140° C., and particularly preferably 50 to 130° C. The hydrogenation reaction is carried out for a time period of from 1 minute to 3 hours. The reaction time may be shorter when a larger amount of the catalyst composition is used and the pressure is higher.

The invention will now be illustrated by means of the following examples. In these examples, all hydrogenation experiments, unless otherwise indicated, were performed at 5.0 MPa hydrogen, and run for 3 hours, during which period samples were drawn from the reactor and analysed by $^1H$ NMR to determine the conversion of the olefinic double bonds. Unless otherwise indicated, the $Cp_2TiCl_2$ catalyst precursor used in the examples was suspended in ONDINA 68 oil (2.5 wt % suspension in oil)(ONDINA is a trade mark).

EXAMPLE 1

Preparation of Hydrogen Terminated SBS Block Copolymer

A 30 liter batch of polystyrene-polybutadiene-polystyrene (SBS) block copolymer of 110,000 molecular weight was prepared in a stainless steel reactor by sequential anionic polymerisation using sec-butyllithium as the initiator. The polymerisation was conducted in cyclohexane (CyC6) at 20 wt % solids, to which was added 140 ppm of diethoxypropane. The vinyl content of the SBS polymer was 40 percent. The polymer contained 30% styrene. At the end of the polymerisation the reactor was sparged with 0.3 MPa of hydrogen for 2 hours to terminate the living SBS-Li polymer and produce a cement composed of SBS and LiH dissolved in CyC6. The LiH content of the polymer cement was determined to be 2.4 mmol/liter.

Comparative Example 2–4

Hydrogenation of SBS block copolymer with bis (cyclopentadienyl) titanium dichloride.

A stainless steel reactor was charged with 800 grams of SBS cement, prepared as described in Example 1. The temperature of the reactor was fixed at 50° C. and the reactor was pressurised to 0.2 MPa of hydrogen to saturate the cement. Meanwhile a suspension of 42 mg (0.169 mmol, 10 ppm of Ti on cement) of bis(cyclopentadienyl)titanium dichloride ($Cp_2TiCl_2$) in 10 ml of CyC6 was prepared. The catalyst suspension was added to the reactor and the hydrogen pressure was raised to 5.0 MPa. Immediately, an exothermic reaction occurred. Following the same procedure two more runs were carried out with 6.5 ppm and 1.0 ppm of Ti on cement.

Figure 1:
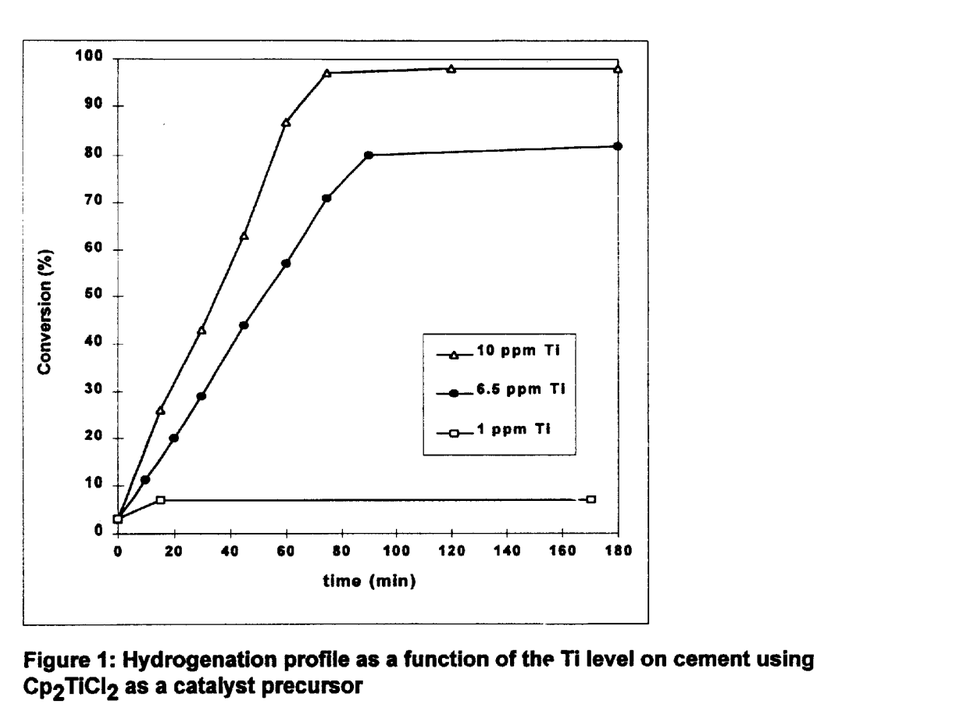
FIG. 1 is a hydrogenation profile as a function o the Ti level on cement using $Cp_2TiCl_2$ as a catalyst precursor.

The results are summarised in Table 1 and FIG. 1. From these results, it may be concluded that when in a conventional process LiH to titanium ratios above 13 are applied, catalyst decay becomes important and full conversion of the olefinic bonds cannot be reached.

TABLE 1

Conversion data as a function of titanium levels on cement

| Example | ppm Ti on cement | LiH/Ti | 15 min conv. (wt %) | 60 min conv. (wt %) | 180 min conv. (wt %) |
|---|---|---|---|---|---|
| C-2 | 10 | 13 | 43 | 87 | 98 |
| C-3 | 6.5 | 20 | 29 | 57 | 82 |
| C-4 | 1.0 | 140 | 7 | 7 | 7 |

EXAMPLE 5

Hydrogenation of SBS block copolymer with $Cp_2TiCl_2$. Part or the LiH is consumed after the activation of the catalyst.

Following the same procedure as described in example 2–4, an experiment was carried out with 27.3 mg (0.110 mmol, 6.5 ppm of Ti on cement) of $Cp_2TiCl_2$. After addition of the catalyst suspension to the reactor, the catalyst suspension and the SBS cement were mixed for 10 minutes. Then 90 mg of ethanol (1.95 mmol, 0.9 equivalent towards the remaining LiH) dissolved in 10 ml of CyC6 was added to the cement. The hydrogen-pressure was raised to 5.0 MPa. Immediately an exothermic reaction occurred.

Figure 2:
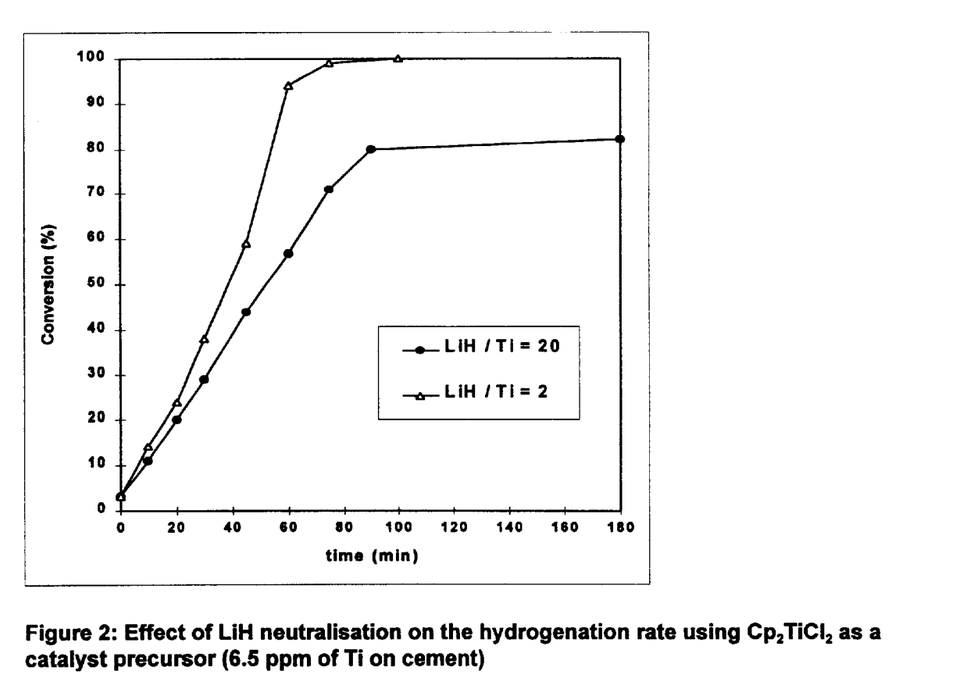
FIG. 2 shows the effect of LiH neutralisation on the hydrogenation rate using $Cp_2TiCl_2$ as a catalyst precursor (6.5 ppm of Ti on cement).

The results are compared with example 3 in Table 2 and FIG. 2. In conclusion, a reduction of the LiH to titanium ratio resulted in a more stable hydrogenation catalyst.

TABLE 2

Conversion data as a function of LiH neutralisation using 6.5 ppm of Ti on cement

| Example | ethanol addition (a) | LiH/Ti before EtOH | LiH/Ti after EtOH | 60 min conv. (wt %) | 100 min conv. (wt %) | 180 min conv. (wt %) |
|---|---|---|---|---|---|---|
| C-3 | 0(b) | 20 | 20 | 57 | 81 | 82 |
| 5 | 0.9 | 20 | 2 | 94 | 99 | 100 |

(a)equivalent of ethanol towards remaining LiH
(b)the deactivation procedure, as in US-A-5173537 resulted in a 180 min. conversion of only 30 wt %

EXAMPLE 6–8

Hydrogenation of SBS block copolymer $Cp_2TiCl_2$. Part of the LiH is consumed after the activation of the catalyst.

Figure 3:
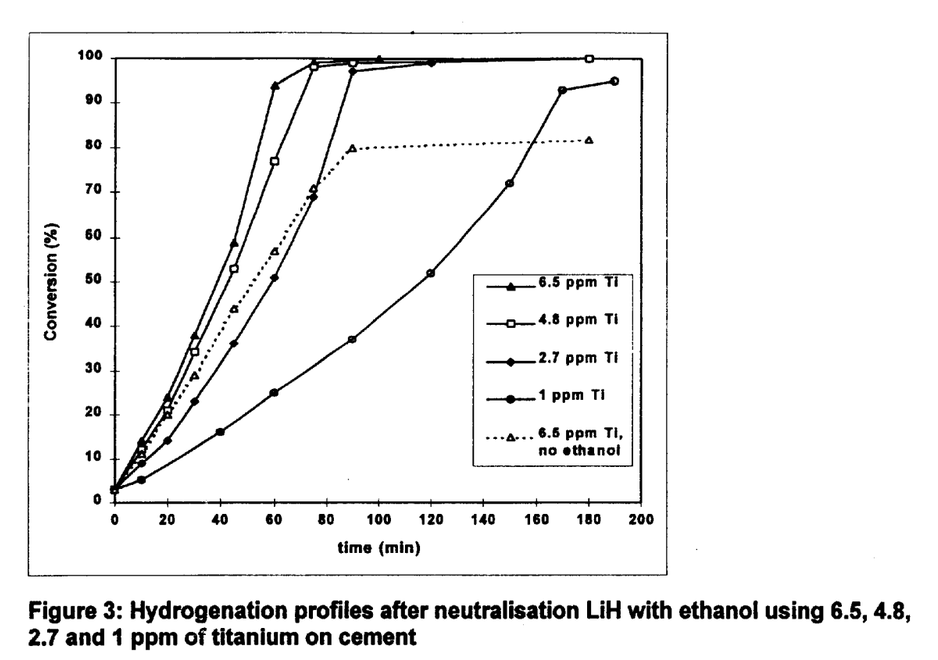
FIG. 3 shows hydrogenation profiles after neutralisation LiH with ethanol using 6.5, 4.8, 2.7 and 1 ppm of titanium on cement.

Following the same procedure as described in example 5 experiments were carried out with 19.9 mg, 11.3 mg, and 4.2 mg of $Cp_2TiCl_2$. The results are compared with example 3 and 5 in Table 3 and FIG. 3. In conclusion, decay of the active hydrogenation catalyst derived from $Cp_2TiCl_2$ is circumvented when the Li is present as LiOEt. Also, nearly full conversion is achieved within 3 hours with only a fraction of the Ti required when the conventional process is applied.

TABLE 3

Conversion data as a function of LiH neutralisation using various levels of Ti on cement

| Example | ppm Ti on cement | ethanol addition (a) | LiH/Ti before EtOH | LiH/Ti after EtOH | 60 min conv. (wt %) | 100 min conv. (wt %) | 180 min conv. (wt %) |
|---|---|---|---|---|---|---|---|
| C-3 | 6.5 | 0 | 20 | 20 | 57 | 81 | 82 |
| 5 | 6.5 | 0.9 | 20 | 2 | 94 | 99 | 100 |
| 6 | 4.8 | 0.87 | 30 | 4 | 77 | 99 | 100 |
| 7 | 2.7 | 0.84 | 53 | 8.5 | 52 | 97 | 99 |
| 8 | 1.0 | 0.85 | 140 | 22 | 26 | 43 | 95 |

(a)-equivalent of ethanol towards remaining LiH

EXAMPLE 9–16

Figure 4:
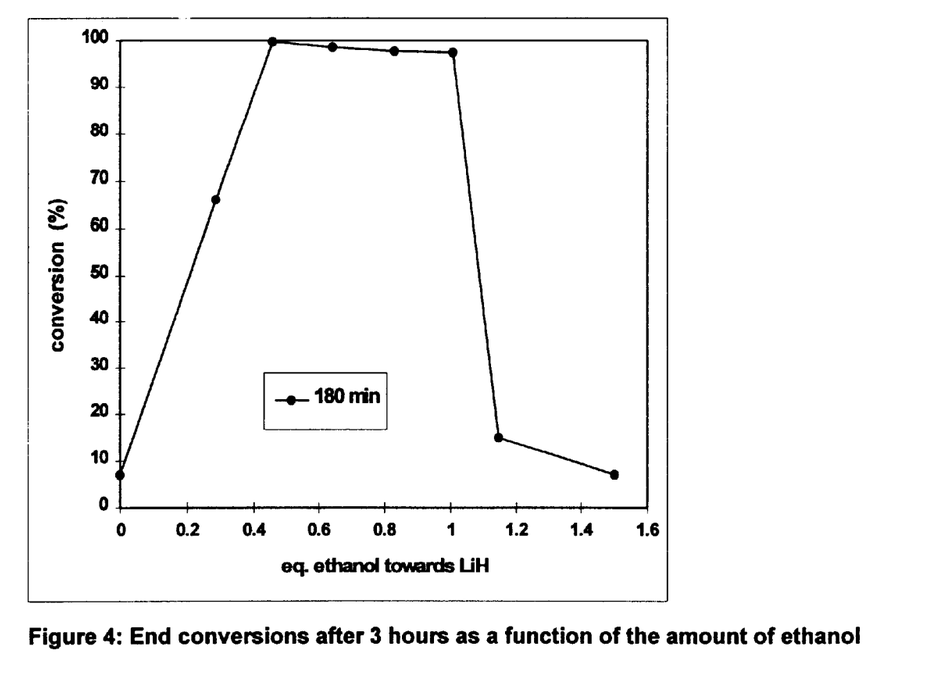
FIG. 4 gives end conversions after 3 hours as a function of the amount of ethanol.

Hydrogenation of SBS block copolymer with $Cp_2TiCl_2$. The amount of ethanol to consume (part of) the remaining LiH was varied. Following the same procedure as described in example 5 experiments were carried out with 4.2 mg of $Cp_2TiCl_2$. After the preparation of the catalyst intermediate (part of) the remaining LiH was neutralised by reaction with ethanol. The hydrogenation experiments were conducted at 60° C. The results are summarised in Table 4 and FIG. 4.

TABLE 4

Conversion data as a function of the neutralisation of the remaining LiH using 1 ppm of titanium on cement

| Example | ethanol addition (a) | LiH/Ti after EtOH | 60 min conv. (wt %) | 100 min conv. (wt %) | 180 min conv. (wt %) |
|---|---|---|---|---|---|
| C-9 | 0 | 140 | 7 | 7 | 7 |
| 10 | 0.29 | 100 | 32 | 48 | 66 |
| 11 | 0.45 | 73 | 60 | 99 | 99.6 |
| 12 | 0.64 | 47 | 58 | 98 | 98.6 |
| 13 | 0.83 | 22 | 58 | 97 | 97.7 |
| 14 | 1.01 | 0 | 54 | 97 | 97.2 |
| C-15 | 1.15 | — | 15 | 15 | 15 |
| C-16 | 1.5 | — | 7 | 7 | 7 |

(a)equivalent of ethanol towards remaining LiH

EXAMPLES 17–18

Hydrogenation of SBS block copolymer with $Cp_2TiCl_2$. The titanium loading was further reduced applying a neutralisation of LiH with ethanol. Following the same procedure as described in example 5 experiments were carried out with 2.1 mg and 0.8 mg of $Cp_2TiCl_2$. After the preparation of the catalyst intermediate 45 per cent of the remaining LiH was neutralised by reaction with ethanol. The results are compared with example 11 in Table 5.

TABLE 5

Experimental data of hydrogenation experiments at 1, 0.5 and 0.2 ppm of titanium on cement

| Example | ppm Ti on cement | hydro. Temp. (° C.) | LiH/Ti at start | after EtOH addition (a) LiH/Ti | after EtOH addition (a) EtOH/Ti | end conv. (wt %) |
|---|---|---|---|---|---|---|
| 11 | 1 | 60 | 138 | 73 | 63 | 99.6 |
| 17 | 0.5 | 70 | 280 | 150 | 130 | 99 |
| 18 | 0.2 | 80 | 760 | 420 | 350 | 96 |

(a)45 percent of the remaining LiH is neutralised by reaction with ethanol

It is possible to start hydrogenation experiments at LiH to Ti ratios of even 760 (example 18). After the ethanol addition this ratio is still 420! Full conversion (99%+) was obtained at ratio's of 73 to 150 after the ethanol addition (examples 11 and 17). As discussed above, before this invention a ratio of 13 or higher caused problems. Notice the high ethanol (or LiOEt) levels, which do not matter. Very high LiH levels are acceptable in the polymer cement.

EXAMPLES 19–23

Hydrogenation of SBS block copolymer with $Cp_2TiCl_2$. The activation time before the ethanol addition was varied. Following the same procedure as described in example 5 experiments were carried out with 4.2 mg of $Cp_2TiCl_2$. After various activation times, 75 percent of the remaining LiH was neutralised by reaction with ethanol. The hydrogenation experiments were carried out at 70° C. The results are summarised in Table 6 and FIG. 5.

Figure 5:
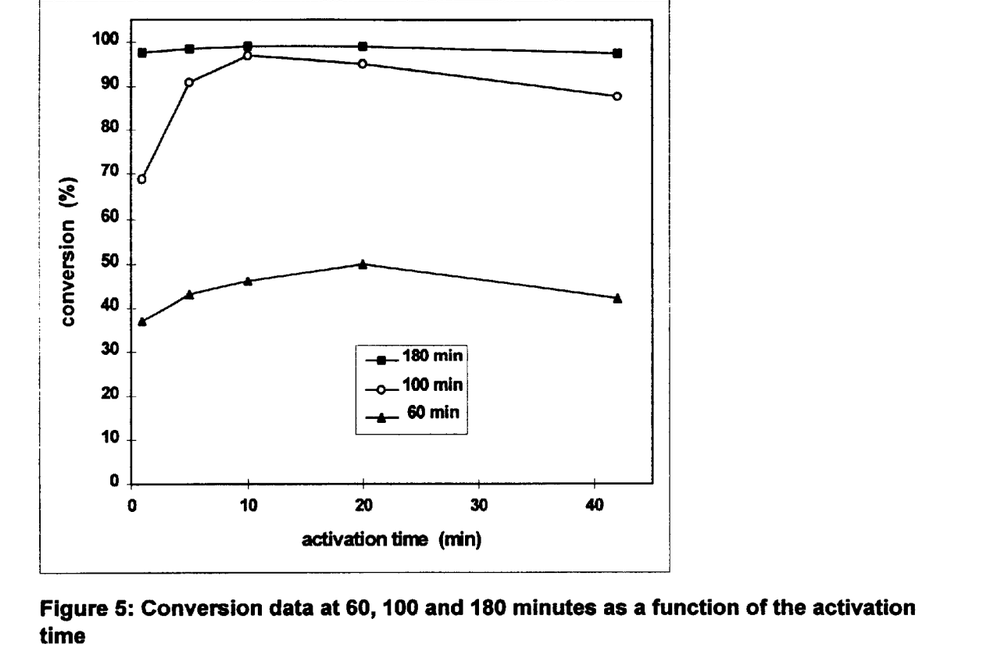
FIG. 5 shows conversion data at 60, 100 and 180 minutes as a function of the activation time.

The hydrogenation profiles show only small differences. After one minute activation the catalyst is active and gives a good end conversion. Even at activation times of more than 40 minutes the catalyst is fully active and the end conversion is on target.

TABLE 6

Conversion data at 60, 100 and 180 minutes as a function of the activation time using 1 ppm of titanium on cement

| Example | act. time (min) | 60 min conv. (wt %) | 100 min conv. (wt %) | 180 min conv. (wt %) |
| --- | --- | --- | --- | --- |
| 19 | 1 | 37 | 69 | 97.5 |
| 20 | 5 | 43 | 91 | 98.5 |
| 21 | 10 | 46 | 97 | 99.1 |
| 22 | 20 | 50 | 95 | 99.1 |
| 23 | 42 | 42 | 88 | 97.5 |

EXAMPLE 24

Hydrogenation of SBS block copolymer with $Cp_2TiCl_2$. The catalyst intermediate was produced in a hydrogen free atmosphere.

Figure 6:
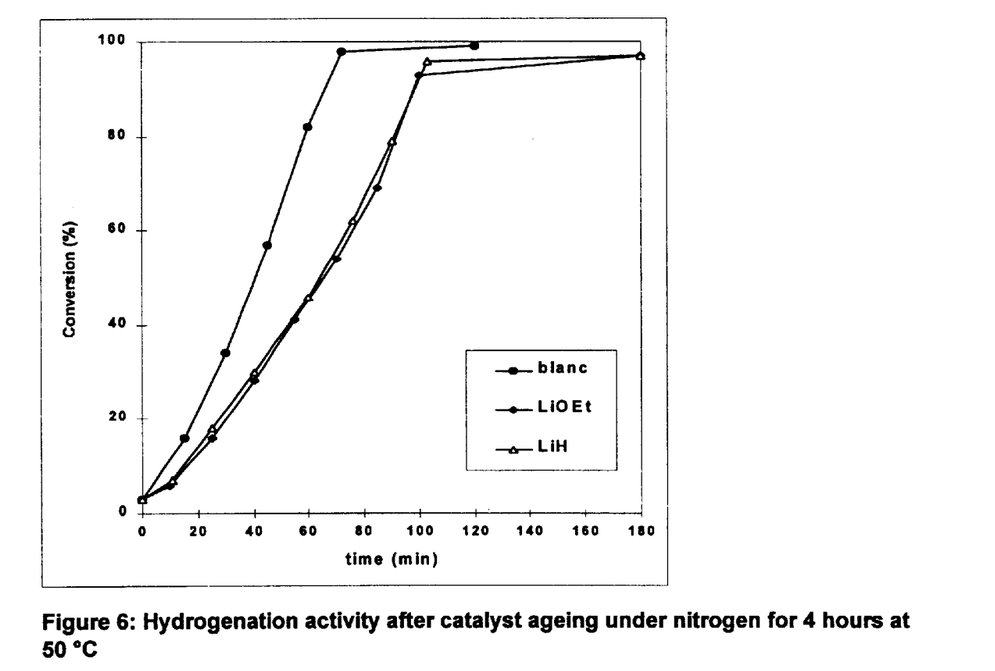
FIG. 6 gives the hydrogenation activity after catalyst ageing under nitrogen for 4 hours at 50° C.

A stainless steel reactor was charged with 800 grams of SBS cement, prepared as described in Example 1. The temperature of the reactor was fixed at 50° C. In the experiment 4.2 mg of $Cp_2TiCl_2$ was applied. After an activation time of 10 minutes at 50° C. and 0.1 MPa of nitrogen, 85 per cent of the remaining LiH was neutralised by reaction with ethanol. The reactor was pressurised with hydrogen and the hydrogenation was allowed to run at 70° C. The results are shown in 7 and FIG. 6.

EXAMPLE 25–26

Hydrogenation of SBS block copolymer with $Cp_2TiCl_2$. The catalyst was aged for 4 hours at 50° C. in a hydrogen free atmosphere.

Following the same procedure as in example 24, two more experiments were carried out. In both experiments the activated catalyst was aged for four hours at 50° C. under 0.1 MPa of nitrogen. In example 25 the remaining LiH was neutralised by reaction with ethanol after 10 minutes activation. In example 26 the ethanol was added after four hours. So an excess of LiH was present during the ageing period! After the four hours ageing the reactor was pressurised with hydrogen and the hydrogenation experiments were allowed to run at 70° C. The results of both experiments are shown in Table 7 and FIG. 6.

Both aged catalysts under a nitrogen atmosphere show a similar reactivity (examples 25 and 26), somewhat lower than the comparative example 24 in which the catalyst was not aged. Still good end conversions were reached after 3 hours of hydrogenation.

TABLE 7

Catalyst activity after 4 hours ageing at 50° C.

| Example | EtOH addition | ageing time (hours) | Atmosphere During ageing | 40 min conv. (wt %) | 100 min conv. (wt %) | 180 min conv. (wt %) |
| --- | --- | --- | --- | --- | --- | --- |
| 24 | after activation | 0 | — | 49 | 98 | 99 |
| 25 | after activation | 4 | 0.1 MPa $N_2$ | 28 | 93 | 97 |
| 26 | after 4 hours | 4 | 0.1 MPa $N_2$ | 30 | 96 | 97 |
| C-27 | after 4 hours | 4 | 2.0 MPa $H_2$ | 22 | 40 | 55 |

Comparative Example 27

Hydrogenation of SBS block copolymer with $Cp_2TiCl_2$. The catalyst was aged for 4 hours at 50° C. under 2.0 MPa of hydrogen.

Figure 7:
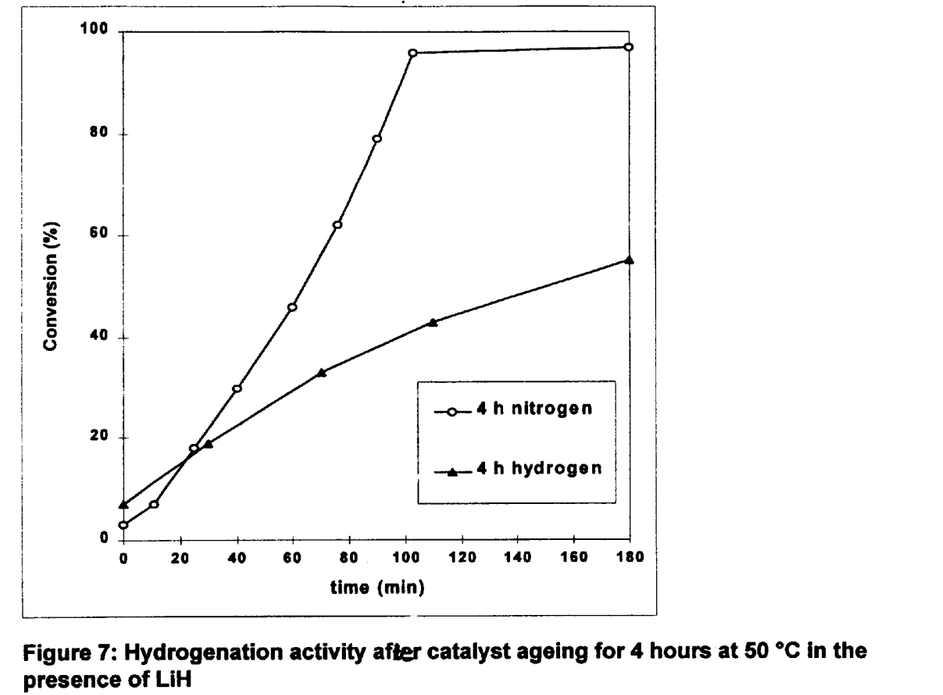
FIG. 7 shows the hydrogenation activity after catalyst ageing for 4 hours at 50° C. in the presence of LiH.

Following the same procedure as in example 24, the activated catalyst was aged for 4 hours at 50° C. under 2.0 MPa of hydrogen, before the ethanol was added. So an excess of LiH was present during the ageing period. After the four hours ageing the hydrogen pressure was raised to 5.0 MPa and the hydrogenation experiments were allowed to run for 3 hours at 70° C. The results are shown in Table 7 and FIG. 7.

Four hours ageing at 50° C. under 2.0 MPa hydrogen gave severe catalyst decay of the activated catalyst and the hydrogenation performance is poor, giving only 55 per cent conversion of olefinic bonds after 3 hours of hydrogenation.

EXAMPLE 28–31

Hydrogenation of SBS block copolymer with $Cp_2TiCl_2$. The catalyst was activated in a hydrogen free atmosphere at different temperatures.

Figure 8:
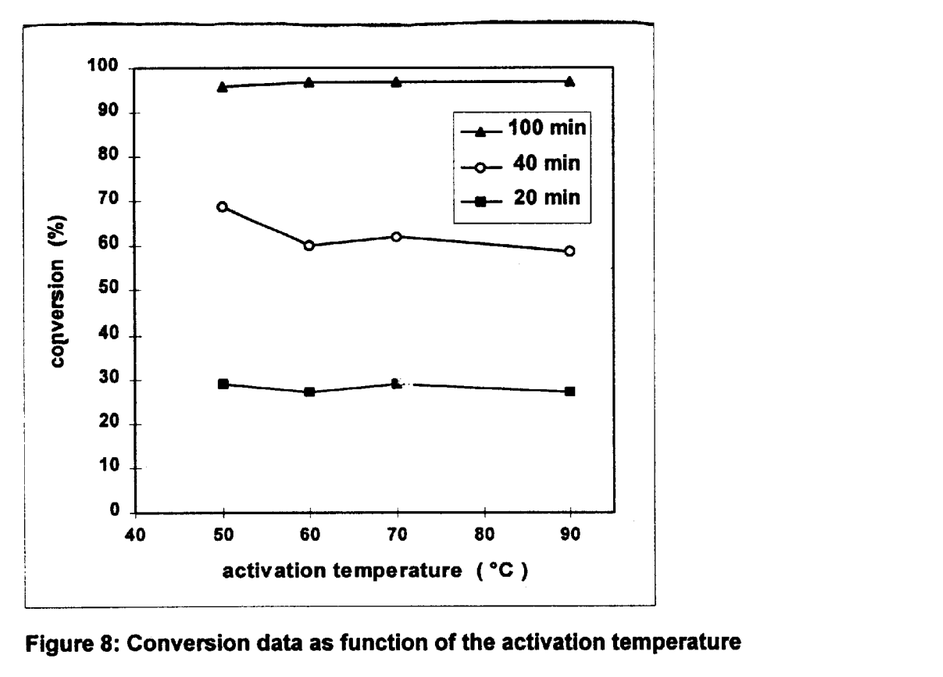
FIG. 8 gives conversion data as function of the activation temperature.

A stainless steel reactor was charged with 800 grams of SBS cement, prepared as described in Example 1. In the experiments 4.2 mg of $Cp_2TiCl_2$ was applied. After an activation time of 10 minutes at various temperatures, 70 per cent of the remaining LiH was neutralised by reaction with ethanol. The hydrogenation was carried out at 70° C. The results are shown in Table 8 and FIG. 8.

TABLE 8

Conversion data as function of the activation temperature

| Example | activation temperature (° C.) | 20 min conv. (wt %) | 40 min conv. (wt %) | 100 min conv. (wt %) |
| --- | --- | --- | --- | --- |
| 28 | 50 | 29 | 69 | 96 |
| 29 | 60 | 27 | 60 | 97 |
| 30 | 70 | 29 | 62 | 97 |
| 31 | 90 | 27 | 59 | 97 |

EXAMPLE 32–36

Hydrogenation of SBS block copolymer with $Cp_2TiCl_2$. The LiH was neutralised by reaction with various neutralising agents.

A stainless steel reactor was charged with 800 grams of SBS cement, prepared as described in Example 1. In the experiments 4.2 mg of $Cp_2TiCl_2$ was applied. After an activation time of 10 minutes at 70° C., 70 per cent of the remaining LiH was consumed by the neutralising agents listed in Table 9. The hydrogenation was carried out at 70° C. The results are shown in Table 9.

TABLE 9

| | | Conversion data as a function of the applied neutralising agent | | |
|---|---|---|---|---|
| Example | compound c | 30 min conv. (wt %) | 60 min conv. (wt %) | 180 min conv. (wt %) |
| 32 | — | 7 | 8 | 8 |
| 33 | ethanol | 48 | 98 | 99 |
| 34 | isopropanol | 47 | 97 | 98 |
| 35 | acetone | 37 | 66 | 77 |
| 36 | Ionol CP[a] | 38 | 79 | 93 |

[a]Ionol OP is 2,6-ditertbutyl-4-methylphenol

We claim:

1. A method for preparing a hydrogenation catalyst system involving the reaction of a group 4 metallocene (A) with a metal hydride or an organometallic compound (B) at a (B)/(A) molar ratio that is larger than 10 followed by the activation of the resulting catalyst mixture with hydrogen at a hydrogen pressure p (in MPa) and at a temperature T (in ° C.), wherein a neutralising agent (C) that is capable of reacting with the compound (B) is added to the catalyst mixture a) either prior to the activation, or b) within t hours from the activation wherein t equals x divided by (p*T*(B)/(A)), and x=10,000.

2. A method as claimed in claim 1, wherein the group 4 metallocene is a compound represented by the following general formula:

in which each R represents the same or a different substituted or unsubstituted, fused, and/or heterocyclic cyclopentadienyl-like $\eta^5$ ligand; each R' represents the same or a different group selected from $C_1$–$C_{12}$ hydrocarbyl groups, $C_1$–$C_{12}$ hydrocarboxyl groups, a carbonyl group, a beta-diketone coordination group, or a halogen atom, and M is a titanium, zirconium or hafnium atom.

3. A method as claimed in claim 1 wherein the metallocene is bis(cyclopentadienyl)titanium dichloride.

4. A method as claimed in claim 1 wherein compound (B) is a lithium compound or a lithium hydride.

5. A method as claimed in claim 1 wherein the (B)/(A) ratio is larger than 15.

6. A method as claimed in claim 5 wherein the (B)/(A) ratio is in the range of 20 to 500.

7. A method as claimed in claim 1 wherein the neutralising agent (C) is selected from ketone compounds, sulphoxide compounds, carboxylic acid compounds, carboxylate ester compounds, aldehyde compounds, lactone compounds, lactam compounds, amine compounds, amide compounds, nitrile compounds, epoxy compounds, and oxime compounds.

8. A method as claimed in claim 7 wherein the neutralising agent (C) is ethanol.

9. A method as claimed in claim 1 wherein the neutralising agent (C) is used in a ratio of (C)/(B) in the range of 0.4 to 1.05.

10. A Method as claimed in claim 9 wherein the ratio of (C)/(B) is in the range of 0.45 to 1.0.

11. A method as claimed in claim 1 wherein the neutralising agent (C) is added within t hours from contacting the catalyst mixture with hydrogen, wherein t is calculated based on x being 7,500.

12. A method as claimed in claim 11 wherein x is 5000.

13. A method as claimed in claim 1 wherein the neutralising agent (C) is added before contacting the catalyst mixture with hydrogen.

* * * * *